DONALD E. CROSS &
WILLIAM E. BLACKBURN
INVENTORS

March 6, 1973    D. E. CROSS ET AL    3,719,579
TOOL HOLDER
Filed Nov. 28, 1969    2 Sheets-Sheet 2
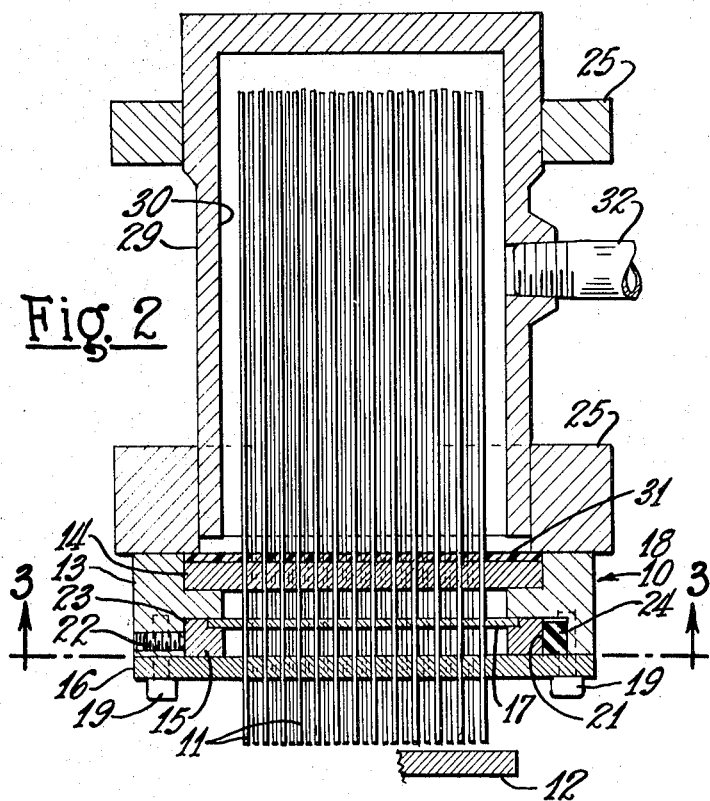
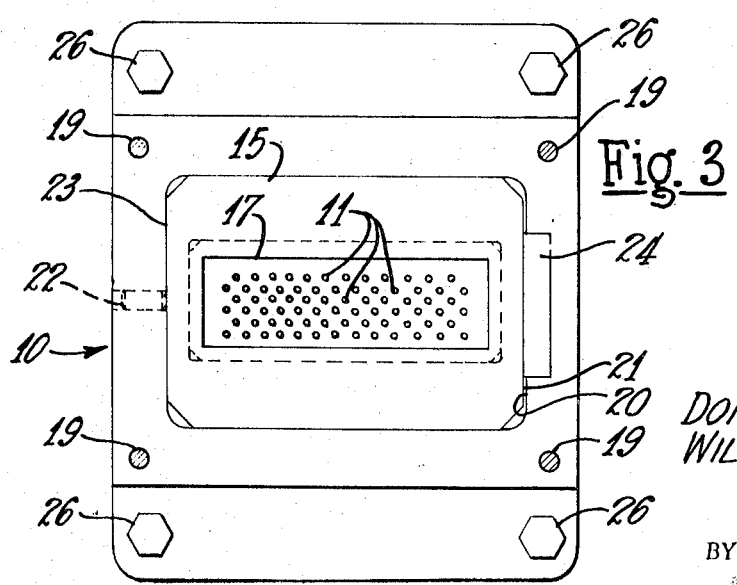
DONALD E. CROSS &
WILLIAM E. BLACKBURN
INVENTORS
BY
Staelin + Overman
ATTORNEYS

United States Patent Office 3,719,579
Patented Mar. 6, 1973

3,719,579
TOOL HOLDER
Donald E. Cross and William E. Blackburn, Newark, Ohio, assignors to Owens-Corning Fiberglas Corporation
Continuation of abandoned application Ser. No. 880,552, Nov. 28, 1969. This application May 24, 1971, Ser. No. 146,436
Int. Cl. B01k 3/04; B23r 9/16; C23b 5/70
U.S. Cl. 204—286                                     13 Claims

ABSTRACT OF THE DISCLOSURE

A device for holding a plurality of elongated tools in a parallel spaced relationship for simultaneously machining a predetermined pattern of holes in a workpiece. The tools are passed sequentially through similar patterns of aligned holes in three spaced, parallel plates: a fixed first plate, a linearly movable second plate and a fixed third plate. After the ends of the tools are aligned for simultaneously engaging the workpiece, a set screw is used to move the second plate in a direction parallel to the first and third plates to simultaneously lock the tools in place. A urethane spring is used to bias the second plate against the set screw. The device is particularly suitable for holding a large number of closely spaced hollow electrodes for either electrical discharge machining or electrochemical machining a large number of small holes in a relatively small surface area.

---

This application is a continuation of application Ser. No. 880,552, filed Nov. 28, 1969, now abandoned.

BACKGROUND OF THE INVENTION

This invention relates to an improved tool holder and, more particularly, to an improved holder for a plurality of tools for simultaneously machining a pattern of holes in a workpiece. The tool holder is particularly suitable for holding a large number of tubular electrodes for use in electrical discharge machining and electrochemical machining equipment.

In recent years, a number of novel precision metal removal techniques have been developed which do not involve conventional rotary or impact cutting. Electrical discharge machining and electrochemical machining are two such techniques. Electrical discharge machining consists of slowly advancing a shaped electrode towards a workpiece while applying a voltage between the electrode and the workpiece. As the electrode advances, sparks jump the small gap between the electrode and the workpiece. Each spark melts away a small particle from the workpiece surface nearest the electrode. A dielectric fluid is simultaneously forced between the electrode and the workpiece to carry away the melted particles. The dielectric fluid is typically forced through a passage in the electrode. Thus, as the electrode is slowly advanced, a hole matching the electrode shape is eroded into the workpiece.

Electrochemical machining, on the other hand, is similar to a controlled reverse electroplating process wherein the anodic workpiece is shaped by electrolytically removing material nearest a shaped cathodic electrode. Electrolyte is pumped under high pressure to rapidly flow between the electrode and the workpiece for preventing deposit of the removed metal on the shaped electrode. The electrode is advanced towards the workpiece as the workpiece is decomposed, thus forming a corresponding shaped hole in the workpiece.

In the past, both electrical discharge machining and electrochemical machining have been used for simultaneously cutting a number of holes in a workpiece. However, a major problem has occurred in mounting a number of closely spaced electrodes for simultaneously machining a pattern of closely spaced parallel holes. Electrode wear during the machining process requires that the electrodes be mounted for easy replacement. In a preferred embodiment, the electrodes are formed from elongated rods or tubes and are releasably mounted such that they can be easily extended to compensate for wear. One known solution has been to mount the electrodes in two parallel rows with set screws releasably holding each electrode in place. The problem here, however, is that a considerable amount of time is required to release the set screws for advancing each electrode. Furthermore, the set screws prevent mounting more than two rows of electrodes on a tool holder.

SUMMARY OF THE INVENTION

According to the instant invention, a device is provided for holding a large number of tools for simultaneously machining a pattern of holes in a workpiece. The tools may be, for example, either hollow or solid electrodes for electrical discharge machining, hollow electrodes for electrochemical machining, or hollow tubes for abrasive jet drilling. The device generally comprises an upper cover plate, a locking plate and a lower cover plate. The three plates are mounted in a parallel spaced relationship by a body member. The upper and lower cover plates are rigidly mounted on the body member while the locking plate is mounted to move linearly in a direction parallel to the cover plates. The locking plate is moved against a urethane spring by means of a set screw. Each of the three plates has an identical pattern of holes matching the pattern to be cut in the workpiece. When the set screw is released and the urethane spring biases the locking plate to an extreme position, the identical patterns of holes in the upper cover plate, the locking plate and the lower cover plate are aligned to slidably receive the tools. All of the tools may be positioned in the device with the tool ends aligned for simultaneously engaging the workpiece. The set screw is then tightened to move the locking plate a short distance. Movement of the locking plate bends the portion of each tool located between the upper and lower cover plates to rigidly lock the tools in place. Should the cutting ends of the tools become shortened through wear, the set screw is released for extending and aligning the tool ends.

Accordingly, it is the primary object of the invention to provide an improved device for holding a plurality of cutting tools for simultaneously machining a predetermined pattern of holes in a workpiece.

Another object of the invention is to provide an improved tool holder in which a plurality of cutting tools can be simultaneously released either for alignment, for extending to compensate for end wear or for replacement, and in which the tools can be readily locked in place for continuing the cutting operation.

Other objects and advantages of the invention will become apparent from the following detailed description, reference being made to the accompanying drawings.

BRIEF DESCRIPTION OF THE DRAWINGS

FIG. 2 is a cross-sectional view taken along line 2—2 of FIG. 1; and

FIG. 3 is a cross-sectional view taken along line 3—3 of FIG. 2.

DESCRIPTION OF THE PREFERRED EMBODIMENT

Figure 1:
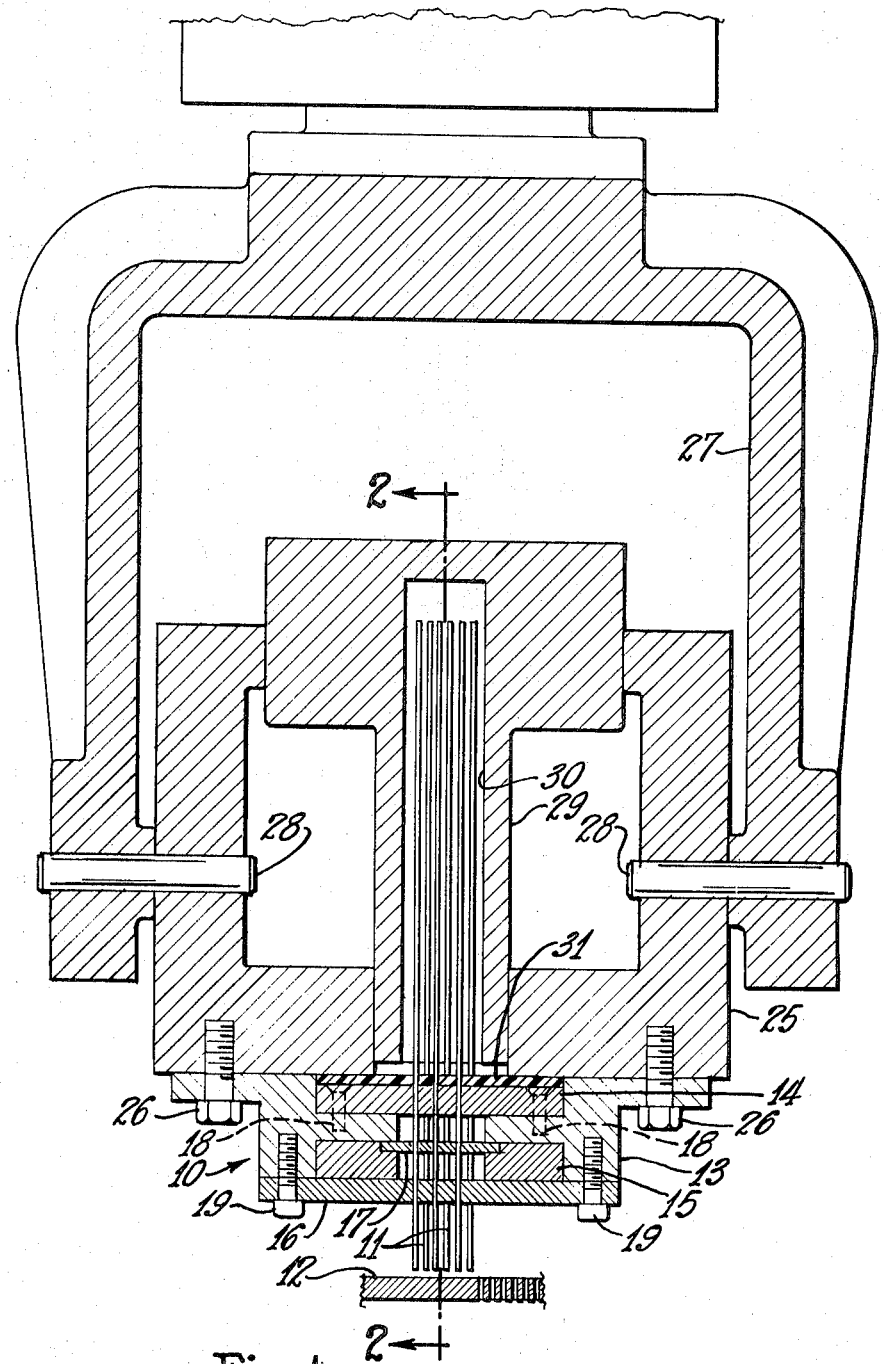
FIG. 1 is a sectioned view of an improved device for holding a plurality of cutting tools in a predetermined pattern and mounted on apparatus for either electrical discharge machining or electrochemical machining.

Referring now to the drawings, an improved tool holding device 10 is shown for holding a large number of closely spaced tubular electrodes 11 for either electrical discharge machining or electrochemically machining a pattern of small fiber forming orifices around the periphery 12 of a glass fiber forming spinner. Although the use of the tool holding device 10 is specifically described, it is not intended that such use be limited. The tool holding device 10 may clearly be used for holding a plurality of either solid or hollow tools and for other well known types of machining processes, such as abrasive jet machining.

The tool holding device 10 generally comprises a body member 13 on which are mounted an upper cover plate 14, a clamp plate 16 and a lower cover plate 16. A relatively thin movable locking plate 17 is attached to and moved by the clamp plate 15. Although the locking plate 17 and the clamp plate 15 are shown as separate elements to facilitate construction, the locking plate 17 and the clamp plate 15 may be combined into a single element. The body member 13 is designed to hold the upper cover plate 14, the movable locking plate 17 and the lower cover plate 16 parallel and spaced apart. The upper cover plate 14 is rigidly attached to the body member 13 by means of a plurality of screws 18, while the lower cover plate 16 is similarly attached to the body member 13 by means of a plurality of screws 19.

As shown in FIG. 3, a space 20 is provided in the body member 13 adjacent one end 21 of the clamp plate 15. The space 20 may, for example, be on the order of 1/32 of an inch to permit the clamp 15 to move for a short distance. As the clamp plate 15 moves, the locking plate 17 is moved in a linear direction parallel to the upper cover plate 14 and the lower cover plate 16. The clamp plate 15 is moved by means of a set screw 22. The set screw 22 contacts an end 23 of the clamp plate 15 which is located opposite to the end 21. A block 24 of urethane, or other suitable elastomeric material, is positioned between the end 21 of the clamp plate 15 and the body member 13, for biasing the clamp plate 15 against the set screw 22. The urethane block 24 is displaced as the set screw 22 is tightend to move the locking plate 17 to a locked position.

As shown in FIG. 1, the tool holding device 10 is attached to a frame member 25 by means of a plurality of screws 26. The frame member 25 is in turn attached to a yoke member 27 by means of pivot pins 28. The frame memer 25 may be rotated on the pivot pins 28 to permit access to the tool holding device 10 and the tubular electrodes 11. A cylindrical member 29 is attached to the frame member 25 for defining a sealed fluid chamber 30 above the upper cover plate 14. A thermoplastic seal 31, such as beeswax, may be positioned between the upper cover plate 14 and the frame member 25 to prevent fluid leakage around the tool holding device 10, the upper cover plate 14 and the electrodes 11. The fluid chamber 30 in the cylindrical member 29 is adapted to receive electrodes 11 which are relatively long when new.

During the milling operation, pressurized fluid is forced through a pipe 32 into the chamber 30 and then through the hollow tubular electrodes 11. If electrical discharge machining is used for machining the spinner 12, the fluid is a dielectric, such as lightweight oil. If the spinner 12 is to be milled by electrochemical machining, the fluid is an electrolyte. In such cases, the electrolyte is usually quite corrosive and the tool holding device 10, the frame member 25, the cylindrical member 29 and the electrodes 11 must be made from corrosion resistant materials. In both processes, a voltage is applied between the electrodes 11 and the spinner 12 and the electrodes 11 are advanced towards the spinner 12 while the fluid is pumped through the hollow electrodes 11. After a pattern of holes is cut in the spinner 12, the spinner 12 is rotated and the process is repeated until the entire periphery of the spinner 12 has been machined.

What we claim is:

1. A device for releasably holding a plurality of elongated tools parallel with the tool ends spaced for cutting a predetermined pattern of holes in a workpiece, said device comprising, in combination, first, second and third generally flat plates, said plates each having an identical plurality of holes therethrough for receiving and holding the tools in the predetermined pattern, means fixedly mounting said first and third plates in parallel spaced relationship, means mounting said second plate parallel to and spaced between said first and third plates, said second plate being mounted for linear movement parallel to said first and third plates, said first, second and third plates being mounted with corresponding pattern holes normally aligned to receive the tools, adjustment means for linearly moving said second plate to lockably engage tools inserted through the aligned holes in said first, second and third plates, and means biasing said second plate against said means.

2. A device for releasably holding a plurality of elongated tools parallel with the tool ends spaced for cutting a predetermined pattern of holes, as defined in claim 1, wherein said means biasing said second plate against said adjustment means comprises a urethane spring, said urethane spring being displaced as said adjustment means moves said second plate out of alignment with said first and third plates.

3. A device for releasably holding a plurality of elongated tools parallel with the tool ends spaced for cutting a predetermined pattern of holes in a workpiece, said device comprising, in combination, first, second and third generally flat plates, said plates each having an identical plurality of holes therethrough for receiving and holding the tools in said predetermined pattern, means fixedly mounting said first and third plates in parallel spaced relationship, means mounting said second plate parallel to and spaced between said first and third plates, said second plate being mounted for linear movement parallel to said first and third plates, said plates being mounted with corresponding pattern holes in said plates normally aligned to receive the tools, means for linearly moving said second plate to lockably engage tools inserted through the aligned holes in said first, second and third plates, and a urethane spring positioned against an end of said second plate, said urethane spring being displaced as said adjustment means moves said second plate out of alignment with said first and third plates.

4. In apparatus for electrical discharge machining orifices in a glass fiber forming spinner, a device for holding a plurality of elongated tubular electrodes in a parallel spaced relationship for simultaneousy cutting a predetermined purality of orifices through the spinner, the orifices forming a desired pattern, said device comprising, in combination, first, second and third generally flat plates, said plates each having an identical plurality of holes therethrough for receiving and holding the electrodes in the desired pattern, a body, said body fixedly mounting said first and third plates in a parallel spaced relationship, said body mounting said second plate parallel to and spaced between said first and third plates, said second plate being mounted for linear movement parallel to said first and third plates, said first, second and third plates being mounted with corresponding pattern holes normally aligned to receive the electrodes, adjustment screw means for linearly moving said second plate to lockably engage electrodes inserted through the aligned holes in said first, second and third plates, and means biasing said second plat against said screw means.

5. A device for holding a plurality of elongated tubular electrodes in a parallel spaced relationship for simultaneously electrical discharge machining a desired pattern of orifices through a glass fiber forming spinner, as defined in claim 4, wherein said adjustment screw means comprises a set screw, said set screw threadably engaging said body and having an end contacting said second plate for moving said second plate.

6. A device for holding a plurality of elongated tubular electrodes in a parallel spaced relationship for simultaneously electrical discharge machining a desired pattern of orifices through a glass fiber forming spinner, as defined in claim 4, wherein said means biasing said second plate against said screw means comprises a urethane spring, said urethane spring being displaced as said screw means moves said second plate out of alignment with said first and third plates.

7. In apparatus for electrochemical machining a predetermined number of holes in a workpiece, the holes being spaced to form a desired pattern, a device for holding the predetermined number of elongated hollow electrodes in a parallel spaced relationship for simultaneously cutting the desired pattern of holes in the workpiece, said device comprising, in combination, first, second and third generally flat corrosion resistant plates, said plates each having an identical plurality of holes therethrough for receiving and holding the electrodes in the desired pattern, a corrosion resistant body, said body fixedly mounting said first and third plates in a parallel spaced relationship, said body mounting said second plate parallel to and spaced between said first and third plates, said second plate being mounted for linear movement parallel to said first and third plates, said first, second and third plates being mounted with corresponding pattern holes normally aligned to receive the electrodes, adjustment screw means for linearly moving said second plate to lockably engage electrodes inserted through the aligned holes in said first, second and third plates, and means biasing said second plate against said screw means.

8. A device for holding a predetermined number of elongated hollow electrodes in a parallel spaced relationship for simultaneously electrochemically machining a desired pattern of holes in a workpiece, as defined in claim 7, wherein said means biasing said second plate against said screw means comprises a urethane spring, said urethane spring being displaced as said screw means moves said second plate out of alignment with said first and third plates.

9. A device for holding a predetermined number of elongated hollow electrodes in a parallel spaced relationship for simultaneously electrochemically machining a desired pattern of holes in a workpiece, as defined in claim 7, and including means for sealing said first plate to said body, whereby the corrosive electrolyte used in electrochemical machining will not leak through the said device.

10. A device for holding a predetermined number of elongated hollow electrodes in a parallel spaced relationship for simultaneously electrochemically machining a desired pattern of holes in a workpiece, as defined in claim 7, wherein said adjustment screw means comprises a set screw, said set screw threadably engaging said body and having an end contacting said second plate for moving said second plate.

11. A device for releasably holding a plurality of elongated tools parallel with the tool ends spaced for cutting a predetermined pattern of holes in a workpiece, said device comprising, in combination, a pair of support members, means fixedly mounting said members in a spaced relationship, said members each having an identical plurality of holes therethrough for receiving the tools, said holes in each member being arranged in the predetermined pattern with corresponding holes in said members being aligned, means positioned between said members for simultaneously engaging all tools inserted through aligned holes in said members for releasably holding such tools in the predetermined pattern, and means for causing said tool engaging means to selectively hold and release the tools inserted through aligned holes in said members.

12. A device for releasably holding a plurality of elongated tools parallel with the tool ends spaced for cutting a predetermined pattern of holes in a workpiece, as defined in claim 11, wherein said means positioned between said members includes a third member having a plurality of holes therethrough identical in number and arrangement to the plurality of holes through said pair of members whereby, when holes in said third member are aligned with corresponding holes in said pair of members, tools may be inserted through the aligned holes.

13. A device for releasably holding a plurality of elongated tools parallel with the tool ends spaced for cutting a predetermined pattern of holes in a workpiece, as defined in claim 12, wherein said means for selectively causing said tool engaging means to hold and release said tools includes means for moving said third member with respect to said pair of members, whereby a force is applied simultaneously to all tools inserted through aligned holes in said pair of members and said third member to releasably hold such tools parallel with the tool ends spaced for cutting the predetermined pattern.

References Cited
UNITED STATES PATENTS

| | | | |
|---|---|---|---|
| 3,421,997 | 1/1969 | Williams | 204—224 |
| 3,474,215 | 10/1969 | Johanson | 204—143 M |
| 2,909,641 | 10/1959 | Kucyn | 219—69 E |
| 3,536,603 | 10/1970 | Bonga | 204—224 |
| 3,196,093 | 7/1965 | Williams | 204—143 M |

JOHN H. MACK, Primary Examiner

R. J. FAY, Assistant Examiner

U.S. Cl. X.R.

204—129.55, 129.6, 224 M, 297 R; 219—69 E